(12) United States Patent
Khan et al.

(10) Patent No.: US 7,744,733 B2
(45) Date of Patent: Jun. 29, 2010

(54) GAS VENTING SYSTEM

(75) Inventors: Amjad Khan, Newington, CT (US); Ken Wayne Dreier, Madison, CT (US); Lawrence Clinton Moulthrop, Windsor, CT (US); Erik James White, Storrs, CT (US)

(73) Assignee: Proton Energy Systems, Inc., Wallingford, CT (US)

( * ) Notice: Subject to any disclaimer, the term of this patent is extended or adjusted under 35 U.S.C. 154(b) by 775 days.

(21) Appl. No.: 11/681,956

(22) Filed: Mar. 5, 2007

(65) Prior Publication Data

US 2008/0220325 A1 Sep. 11, 2008

(51) Int. Cl.
*C25B 9/00* (2006.01)
(52) U.S. Cl. ............... 204/278; 204/275.1; 204/270; 204/266; 204/265; 204/263; 204/258; 204/257; 204/256; 204/255; 429/19; 429/26; 429/30; 429/32; 429/82
(58) Field of Classification Search ............... 204/255, 204/256, 257, 258, 263, 265, 266, 269, 270, 204/275.1, 277, 278; 429/19, 26, 30, 32, 429/34, 38, 39, 71, 72, 82
See application file for complete search history.

(56) References Cited

U.S. PATENT DOCUMENTS

| | | | | |
|---|---|---|---|---|
| 5,980,726 | A * | 11/1999 | Moulthrop et al. | 205/637 |
| 2003/0148171 | A1 * | 8/2003 | Mitlitsky et al. | 429/53 |
| 2005/0121315 | A1 * | 6/2005 | Baltrucki et al. | 204/228.4 |
| 2005/0129996 | A1 * | 6/2005 | Moulthrop et al. | 429/17 |
| 2006/0118428 | A1 * | 6/2006 | Baltrucki et al. | 205/637 |
| 2008/0029389 | A1 * | 2/2008 | Dreier et al. | 204/270 |

* cited by examiner

*Primary Examiner*—Bruce F Bell
(74) *Attorney, Agent, or Firm*—Cantor Colburn LLP

(57) ABSTRACT

A system to vent a moist gas stream is disclosed. The system includes an enclosure and an electrochemical cell disposed within the enclosure, the electrochemical cell productive of the moist gas stream. A first vent is in fluid communication with the electrochemical cell for venting the moist gas stream to an exterior of the enclosure, and a second vent is in fluid communication with an interior of the enclosure and in thermal communication with the first vent for discharging heated air to the exterior of the enclosure. At least a portion of the discharging heated air is for preventing freezing of the moist gas stream within the first vent.

20 Claims, 4 Drawing Sheets

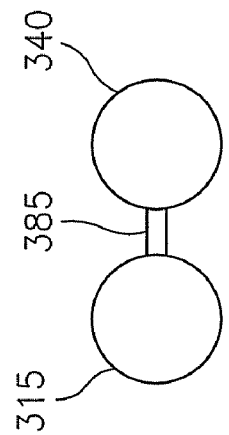
FIG. 5D
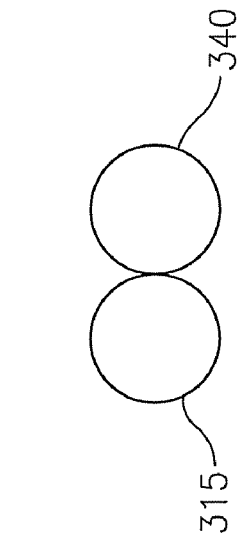
FIG. 5G
FIG. 5C
FIG. 5F
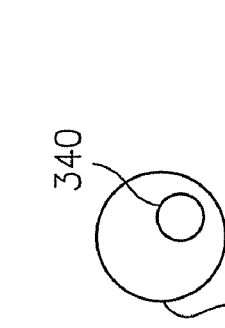
FIG. 5B
FIG. 5E
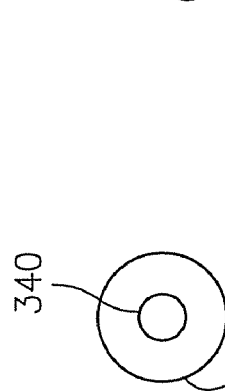
FIG. 5A

GAS VENTING SYSTEM

FEDERAL RESEARCH STATEMENT

This invention was made with Government support under prime contract DE-FG36-03GO13063, Sub-Contract RF-04-HFS-002-A02 by the Department of Energy. The Government has certain lights in this invention.

BACKGROUND OF THE INVENTION

The present disclosure relates generally to electrochemical cells, and particularly to venting gasses that result from operation of electrochemical cells.

Electrochemical cells are energy conversion devices, usually classified as either electrolysis cells or fuel cells. A proton exchange membrane electrolysis cell can function as a hydrogen generator by electrolytically decomposing water to produce hydrogen and oxygen gas, and can function as a fuel cell by electrochemically reacting hydrogen with oxygen to generate electricity. Referring to FIG. 1, which is a partial section of a typical anode feed electrolysis cell 100, process water 102 is fed into cell 100 on the side of an oxygen electrode (anode) 116 to form oxygen gas 104, electrons, and hydrogen ions (protons) 106. The reaction is facilitated by the positive terminal of a power source 120 electrically connected to anode 116 and the negative terminal of power source 120 connected to a hydrogen electrode (cathode) 114. The oxygen gas 104 and a portion of the process water 108 exits the cell 100, while protons 106 and water 110 migrate across a proton exchange membrane 118 to cathode 114 where hydrogen gas 112 is produced.

Another typical water electrolysis cell using the same configuration as is shown in FIG. 1 is a cathode feed cell, wherein process water is fed on the side of the hydrogen electrode. A portion of the water migrates from the cathode across the membrane to the anode where hydrogen ions and oxygen gas are formed due to the reaction facilitated by connection with a power source across the anode and cathode. A portion of the process water exits the cell at the cathode side without passing through the membrane.

A typical fuel cell uses the same general configuration as is shown in FIG. 1. Hydrogen, from hydrogen gas, methanol, or other hydrogen source, is introduced to the hydrogen electrode (the anode in fuel cells), while oxygen, or an oxygen-containing gas such as air, is introduced to the oxygen electrode (the cathode in fuel cells). Water can also be introduced with the feed gas. Hydrogen electrochemically reacts at the anode to produce protons and electrons, wherein the electrons flow from the anode through an electrically connected external load, and the protons migrate through the membrane to the cathode. At the cathode, the protons and electrons react with oxygen to form water, which additionally includes any feed water that is dragged through the membrane to the cathode. The electrical potential across the anode and the cathode can be exploited to power an external load.

In other embodiments, one or more electrochemical cells can be used within a system to both electrolyze water to produce hydrogen and oxygen, and to produce electricity by converting hydrogen and oxygen back into water as needed. Such systems are commonly referred to as regenerative fuel cell systems.

Electrochemical cell systems typically include a number of individual cells arranged in a stack, with the working fluids directed through the cells via input and output conduits or ports formed within the stack structure. The cells within the stack are sequentially arranged, each including a cathode, a proton exchange membrane, and an anode. The cathode and anode may be separate layers or may be integrally arranged with the membrane. Each cathode/membrane/anode assembly (hereinafter "membrane-electrode-assembly", or "MEA") typically has a first flow field in fluid communication with the cathode and a second flow field in fluid communication with the anode. The MEA may furthermore be supported on both sides by screen packs or bipolar plates that are disposed within, or that alternatively define, the flow fields. Screen packs or bipolar plates may facilitate fluid movement to and from the MEA, membrane hydration, and may also provide mechanical support for the MEA.

In order to maintain intimate contact between cell components under a variety of operational conditions and over long time periods, uniform compression may be applied to the cell components. Pressure pads or other compression means are often employed to provide even compressive force from within the electrochemical cell.

As a result of normal operation of the cell 100, at least one of the hydrogen gas 112 and the oxygen gas 104 will include moisture or water vapor 110, 108. A gas dryer is often used to remove the moisture 110, 108 from at least one of the hydrogen gas 112 and the oxygen gas 104. Use of the gas dryer will produce two gas streams: one dried gas stream that is provided as the desired end product and one moist gas stream that is vented to transport the moisture removed from the dried gas stream.

Electrochemical cell systems adapted for outdoor use, where temperatures may fall below the freezing point of water, can incorporate a number of arrangements to prevent freezing of a vent stack used to transport the moist gas stream. Examples of such arrangements include electrical heating tapes disposed surrounding the vent stack of the moist gas, and/or additional dried carrier gases injected into the vent stack to increase a flow rate and thereby effect a volumetric dilution of the moisture. Electrical heating tapes represent additional components of the cell system that may require maintenance and service, and therefore reduce an overall reliability of the electrochemical cell system. When used in a potential presence of hydrogen, electrical heating tapes must be rated for an explosive environment, which adds to a cost and complexity of the system. Furthermore, electricity consumed by electrical heating tapes lowers an overall net efficiency of the electrochemical cell. Dried carrier gases require additional components, such as valves and solenoids for example, to be incorporated into the electrochemical cell system and can result in a similar reduction in overall system reliability. Further, dried carrier gases represent an additional operating cost of the cell system as a consumable material. Accordingly, a need exists for an improved gas venting arrangement that overcomes these drawbacks.

BRIEF DESCRIPTION OF THE INVENTION

An embodiment of the invention includes a system to vent a moist gas stream. The system includes an enclosure and an electrochemical cell disposed within the enclosure, the electrochemical cell productive of the moist gas stream. A first vent is in fluid communication with the electrochemical cell for venting the moist gas stream to an exterior of the enclosure, and a second vent is in fluid communication with an interior of the enclosure and in thermal communication with the first vent for discharging heated air to the exterior of the enclosure. At least a portion of the discharging heated air is for preventing freezing of the moist gas stream within the first vent.

Another embodiment of the invention includes an electrochemical cell system. The electrochemical system includes an enclosure, an electrochemical cell disposed within the enclosure, the electrochemical cell productive of a moist gas stream, and a venting system to vent the moist gas stream. The venting system includes a first vent in fluid communication with the electrochemical cell for venting the moist gas stream to an exterior of the enclosure and a second vent in fluid communication with an interior of the enclosure and in thermal communication with the first vent for discharging heated air to the exterior of the enclosure. At least a portion of the discharging heated air is for preventing freezing of the moist gas stream within the first vent.

These and other advantages and features will be more readily understood from the following detailed description of preferred embodiments of the invention that is provided in connection with the accompanying drawings.

BRIEF DESCRIPTION OF THE DRAWINGS

Referring to the exemplary drawings wherein like elements are numbered alike in the accompanying Figures:

FIGS. 5A through 5G depict alternate arrangements of a heat stack in thermal communication with a vent stack in accordance with embodiments of the invention.

DETAILED DESCRIPTION OF THE INVENTION

An embodiment of the invention provides an electrochemical cell system that includes a heat stack in thermal communication with a vent stack to utilize heat generated within an enclosure of the electrochemical cell to heat the vent stack and prevent freezing of the moist gas stream therein, thereby eliminating the use of electrical heat tapes and/or dried carrier gasses.

Figure 1:
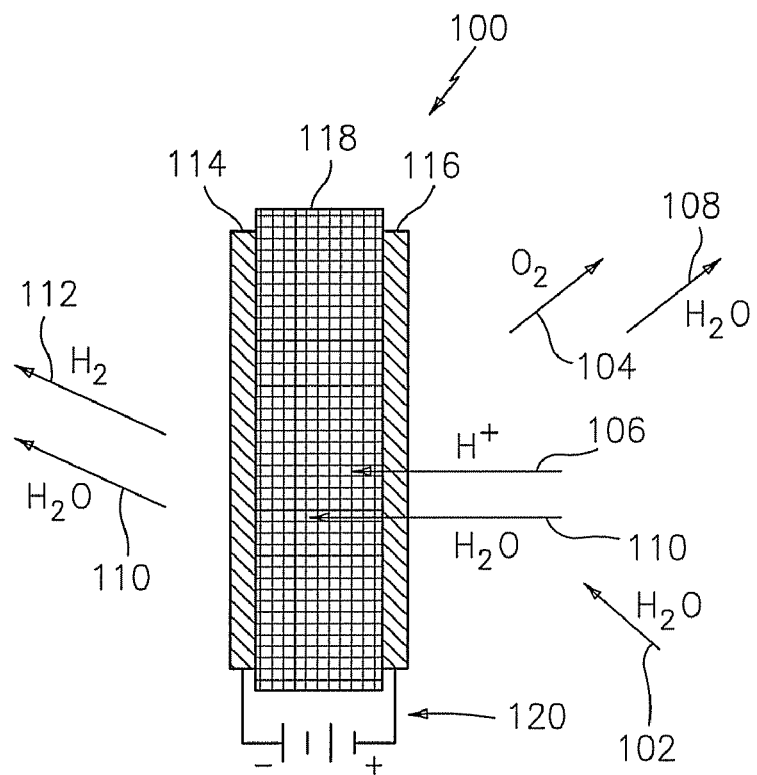
FIG. 1 depicts a schematic diagram of a partial electrochemical cell in accordance with embodiments of the invention.
Figure 2:
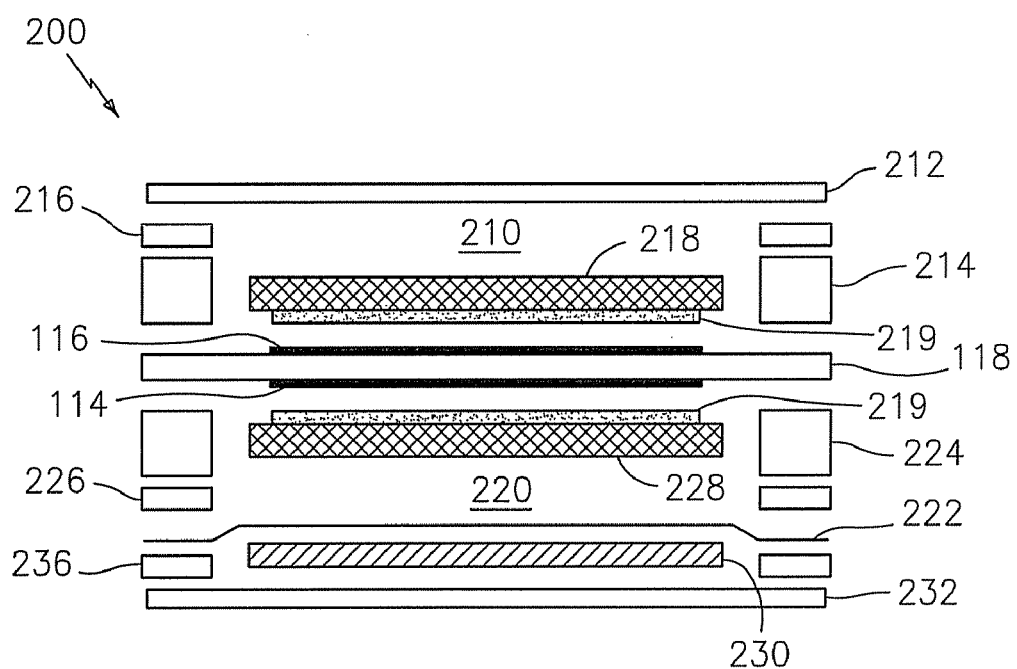
FIG. 2 depicts a schematic diagram of an electrochemical cell system for use in embodiments of the invention.

Referring to FIG. 2, an electrochemical cell 200 that may be suitable for operation as an anode feed electrolysis cell, cathode feed electrolysis cell, fuel cell, or regenerative fuel cell, is depicted schematically in an exploded cross section view. Thus, while the discussion below may be directed to an anode feed electrolysis cell, cathode feed electrolysis cells, fuel cells, and regenerative fuel cells are also contemplated. Cell 200 is typically one of a plurality of cells employed in a cell stack as part of an electrochemical cell system. When cell 200 is used as an electrolysis cell, voltage inputs are generally between about 1.48 volts and about 3.0 volts, at current densities between about 50 A/ft2 (amperes per square foot) and about 4,000 A/ft2. When used as a fuel cell, voltage outputs range between about 0.4 volts and about 1 volt, at current densities of about 0.1 A/ft2 and about 10,000 A/ft2. The number of cells within the stack, and the dimensions of the individual cells are scalable to the cell power output and/or gas output requirements. Accordingly, application of electrochemical cell 200 may involve a plurality of cells 200 arranged electrically either in series or parallel depending on the application. Cells 200 may be operated at a variety of pressures, such as up to or exceeding 50 psi (pounds-per-square-inch), up to or exceeding about 100 psi, Up to or exceeding about 500 psi, up to or exceeding about 2500 psi, or even up to or exceeding about 10,000 psi, for example.

In an embodiment, cell 200 includes a membrane 118 having a first electrode (e.g., an anode) 116 and a second electrode (e.g., a cathode) 114 disposed on opposite sides thereof. Flow fields 210, 220, which are in fluid communication with electrodes 116 and 114, respectively, are defined generally by the regions proximate to, and bounded on at least one side by, each electrode 116 and 114 respectively. A flow field member (also herein referred to as a screen pack) 228 may be disposed within flow field 220 between electrode 114 and, optionally, a pressure pad separator plate 222. A pressure pad 230 is typically disposed between pressure pad separator plate 222 and a cell separator plate 232. Cell separator plate 232 is disposed adjacent to pressure pad 230. A frame 224, generally surrounding flow field 220 and an optional gasket 226, is disposed between frame 224 and pressure pad separator plate 222 generally for enhancing the seal within the reaction chamber defined on one side of cell system 200 by frame 224, pressure pad separator plate 222 and electrode 114. Gasket 236 may be disposed between pressure pad separator plate 222 and cell separator plate 232 enclosing pressure pad 230.

Another screen pack 218 may be disposed in flow field 210. Optionally, screen packs 218, 228 may include a porous plate 219 as depicted. The porous plate 219 shall preferably be of conductive material, and may be included to provide additional mechanical support to the electrodes 116, 114. A frame 214 generally surrounds screen pack 218. A cell separator plate 212 is disposed adjacent screen pack 218 opposite oxygen electrode 116, and a gasket 216 may be disposed between frame 214 and cell separator plate 212, generally for enhancing the seal within the reaction chamber defined by frame 214, cell separator plate 212 and the oxygen side of membrane 118. The cell components, particularly cell separator plates 212, 232, flames 214, 224, and gaskets 216, 226, and 236 are formed with the suitable manifolds or other conduits as is conventional.

In an embodiment, membrane 118 comprises electrolytes that are preferably solids or gels under the operating conditions of the electrochemical cell. Useful materials include proton conducting ionomers and ion exchange resins. Useful proton conducting ionomers include complexes comprising an alkali metal salt, an alkali earth metal salt, a protonic acid, or a protonic acid salt. Useful complex-forming reagents include alkali metal salts, alkaline metal earth salts, and protonic acids and protonic acid salts. Counter-ions useful in the above salts include halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, and the like. The alkali metal salt, alkali earth metal salt, protonic acid, or protonic acid salt is complexed with one or more polar polymers such as a polyether, polyester, or polyimide, or with a network or cross-linked polymer containing the above polar polymer as a segment. Useful polyethers include polyoxyallcylenes, such as polyethylene glycol, polyethylene glycol monoether, and polyethylene glycol diether; copolymers of at least one of these polyethers, such as poly(oxyethylene-co-oxypropylene) glycol, poly (oxyethylene-co-oxypropylene) glycol monoether, and poly (oxyethylene-co-oxypropylene) glycol diether; condensation products of ethylenediamine with the above polyoxyalkylenes; and esters, such as phosphoric acid esters, aliphatic carboxylic acid esters or aromatic carboxylic acid esters of the above polyoxyalkylenes. Copolymers of, e.g., polyethylene glycol with dialkylsiloxanes, maleic anhydride, or polyethylene glycol monoethyl ether with methacrylic acid are known in the art to exhibit sufficient ionic conductivity to be useful.

Ion-exchange resins useful as proton conducting materials include hydrocarbon- and fluorocarbon-type resins. Hydrocarbon-type ion-exchange resins include phenolic resins, condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins may include hydrates of tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids and bases. One family of fluorocarbon-type resins having sulfonic acid group functionality is NAFION (™) resins (commercially available from E. I. du Pont de Nemours and Company, Wilmington, Del.).

Electrodes 116 and 114 may comprise a catalyst suitable for performing the needed electrochemical reaction (i.e., electrolyzing water and producing hydrogen). Suitable catalyst include, but are not limited to, materials comprising platinum, palladium, rhodium, carbon, gold, tantalum, tungsten, ruthenium, iridium, osmium, alloys thereof, and the like. Electrodes 116 and 114 may be formed on membrane 118, or may be layered adjacent to, but in contact with, membrane 118.

Screen packs 218, 228 support membrane 118, allow the passage of system fluids, and preferably are electrically conductive. The screen packs 218, 228 may include one or more layers of perforated sheets or a woven mesh formed from metal or strands.

Pressure pad 230 provides even compression between cell components, is electrically conductive, and therefore generally comprises a resilient member, preferably an elastomeric material, together with a conductive material. Pressure pad 230 is capable of maintaining intimate contact to cell components at cell pressures up to or exceeding about 100 psi, preferably about 500 psi, more preferably about 2,500 psi, or even more preferably about 10,000 psi. The pressure pads can thus be introduced into a high-pressure electrochemical cell environment. The foregoing is intended for illustration, and not limitation.

Figure 3:
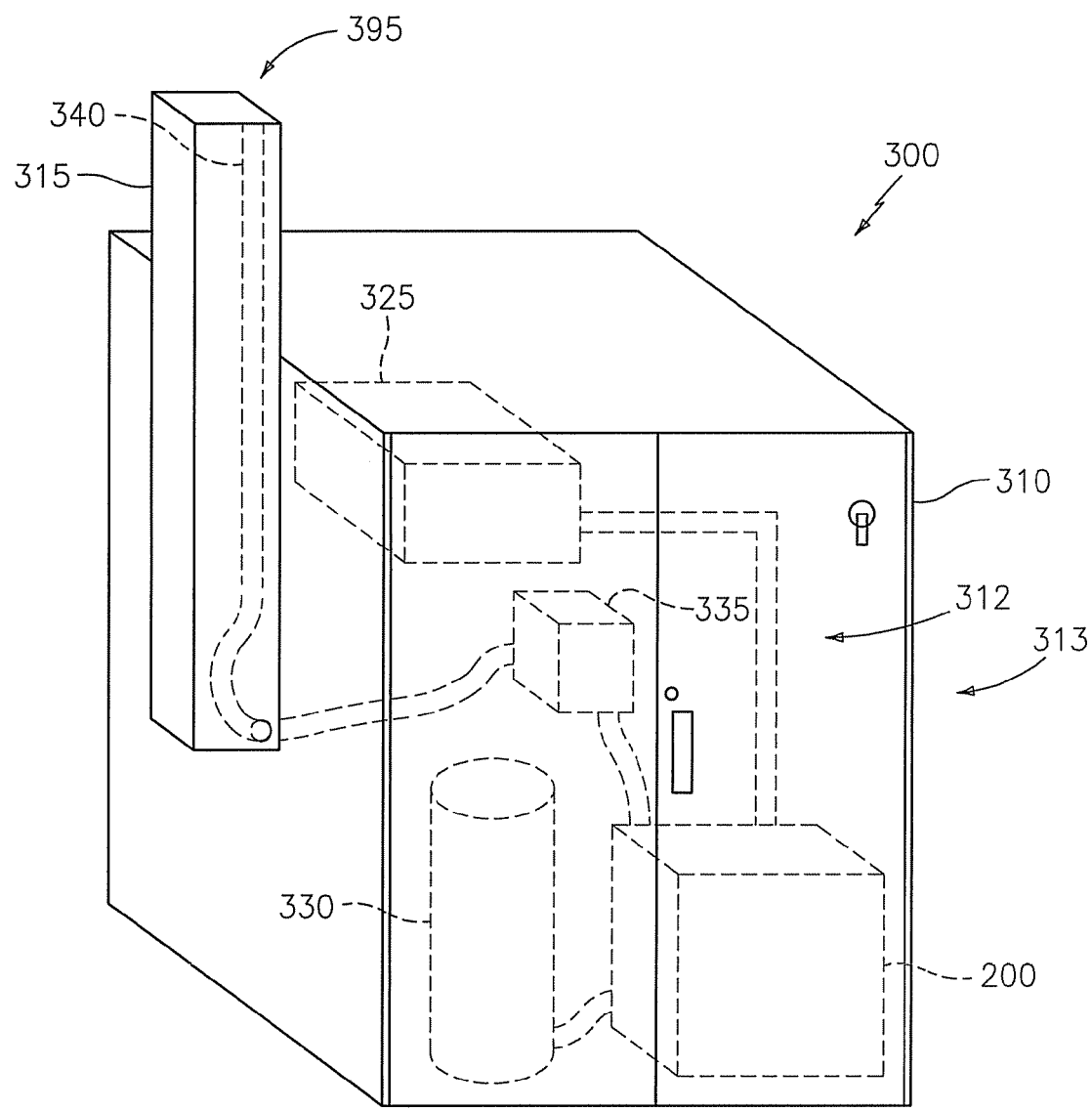
FIG. 3 depicts an electrochemical cell system in accordance with embodiments of the invention.

Referring now to FIG. 3, an electrochemical cell system 300 is depicted. The system 300 includes an enclosure 310 having an interior 312 and an exterior 313, and a first vent 315 (also herein referred to as a heat stack) in fluid communication with the interior 312 of the enclosure 310. Disposed within the interior 312 is at least one electrochemical cell 200, power controls 325 in electrical connection with the electrochemical cell 200 to control power input to or output from the cell 200, and a storage container 330 in fluid communication with the electrochemical cell 200 to store appropriate materials needed for operation of the electrochemical cell 200. The electrochemical cell system 300 also includes a gas dryer 335 in fluid communication with the electrolysis cell 200. The gas dryer 335 receives a moist gas stream produced by the electrochemical cell 200 and provides the dried gas stream dispensed via a dried gas transport 339 (best seen in reference to FIG. 4). The moist gas stream vented is vented to the exterior 313 of the enclosure 310 by a second vent 340 (also herein referred to as a vent stack) in fluid communication with the electrochemical cell 200 via the gas dryer 335. The vent stack 340 is in thermal communication with the heat stack 315, as will be described further below.

In an exemplary embodiment, the electrochemical cell system 300 is adapted for outdoor use where temperatures may fall below freezing. The electrochemical cell 200 is an electrolysis cell configured to produce hydrogen gas 112 using electricity provided via the power controls 325 and process water 102 stored within the storage container 330.

Figure 4:
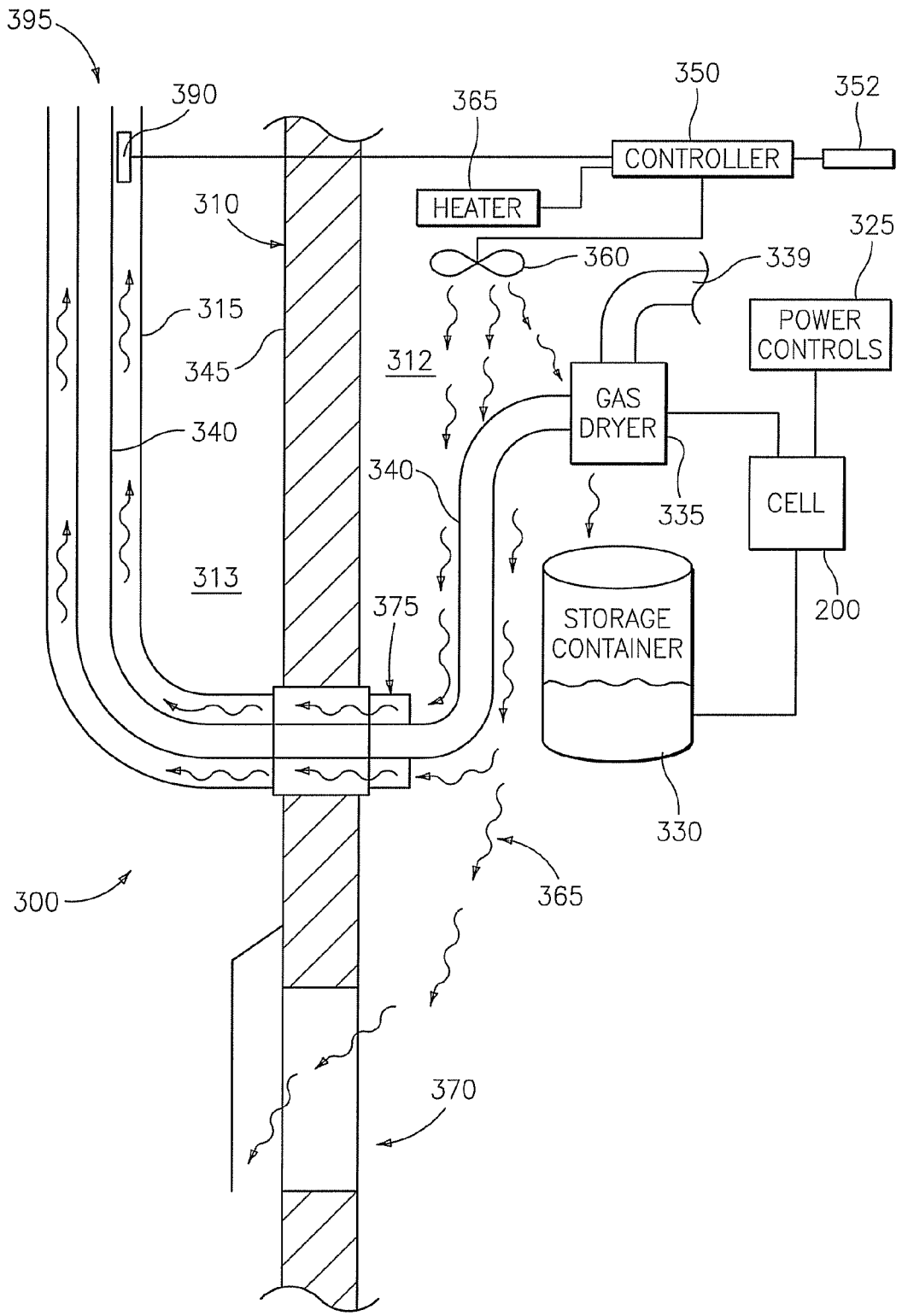
FIG. 4 depicts a cut-away section of an enclosure of an electrochemical cell system in accordance with embodiments of the invention.

Referring now to FIG. 4, a cut away schematic view of the enclosure 310 is depicted. The interior 312 of the enclosure 310 is represented to the right of an enclosure wall 345, and the exterior 313 of the enclosure 310 is represented to the left of the enclosure wall 345. A temperature sensor 352 is disposed proximate the enclosure, such as mounted within the interior 312, upon the exterior 313, or within close proximity of the enclosure 310 and is productive of a signal representative of a temperature proximate the enclosure 310. A controller 350 is receptive of the signal produced by the temperature sensor 352. At least one of a heater 355 and a fan 360 are disposed proximate the enclosure 310, such as mounted within the interior 312, upon the exterior 313, or in an external housing in fluid communication with the interior 312, for example. The heater 355 and fan 360 are in signal communication with the controller 350. In response to the temperature sensor 352 producing a signal that represents a temperature proximate the enclosure 310 that may lead to freezing of the process water 102 within the storage container 330, at least one of the heater 355 and the fan 360 are responsive to the controller 350 to maintain a defined process temperature of the interior 312 that is above the freezing temperature of the process water 102. Streams of air (indicated generally by wavy lines 365) that have been processed via at least one of the heater 355 and the fan 360 circulate within the enclosure 310 to maintain the defined process temperature above the freezing point of the process water 102.

It will be appreciated that operation of components within the enclosure 310, such as the cell 200 and the power controls 325 for example, will generate heat. In an exemplary embodiment, the temperature sensor 352 is disposed within the interior 312 to be responsive to heat generated by components within the enclosure 310. Accordingly, any heat generated by the components within the enclosure 310 will be used to maintain the temperature of the interior 312 above the freezing temperature of the process water 102. Use of heat generated by components within the enclosure is contemplated to reduce use of energy by the heater 355 to heat the air 365.

A portion of the processed (also herein referred to as heated) air 365 may exit the enclosure 310 via a vent 370 to prevent a buildup or concentration of any of process gasses, such as oxygen and hydrogen, within the interior 312. Another portion of the processed air 365 is discharged to the exterior 313 of the enclosure 310 via the heat stack 315 through an opening 375.

In an embodiment the heat stack 315 is separate from the vent stack 340. That is, the heat stack 315 is in fluid communication with the interior 312 of the enclosure 310 for discharging the processed air 365 to the exterior 313 independent of the vent stack 340, which is in fluid communication with the electrochemical cell 200 via the gas dryer 335 to vent the moist gas stream. As such, it will be understood that the heat stack 315 and the vent stack 340 are two separate structures that are related as disclosed herein.

As described above, the heat stack 315 is in thermal communication with the vent stack 340. As used herein, the term "thermal communication" represents two objects, such as the heat stack 315 and the vent stack 340, specifically adapted for the transfer of heat from one to the other. Referring now to FIGS. 5A through 5G, cross section views of various arrangements of the heat stack 315 in thermal communication with the vent stack 340 are depicted. FIGS. 5A and 5B depict the heat stack 315 disposed surrounding the vent stack 340. FIGS. 5C and 5D depict the vent stack 340 disposed surrounding the heat stack 315. FIG. 5E depicts the heat stack 315 disposed adjacent the vent stack 340. FIG. 5F depicts the heat stack 315 disposed adjacent the vent stack 340 within a common outer housing 380. FIG. 5G depicts the heat stack 315 disposed proximate the vent stack 340, with a heat transfer member 385 disposed therebetween. It will be appreciated that the foregoing are for purposes of illustration, and not limitation.

Referring back now to FIG. 4, at least a portion of the processed (heated) air 365 flowing through the heat stack 315 in thermal communication with the vent stack 340 heats the moist gas stream within the vent stack 340. The heating of the moist gas stream within the vent stack 340 via the processed air 365 flowing through the heat stack 315 may be known as heat tracing, and prevents freezing of the moist gas stream within the vent stack 340. The heat tracing of the vent stack 340 utilizes the controller 350, and at least one of the heater 355 and the fan 360 that are present within the enclosure 310 to maintain the defined process temperature of the interior 312. Accordingly, the discharging of processed air 365 by the heat stack 315 in thermal communication with the vent stack 340 is used for preventing freezing of the moist gas stream within the vent stack 340. Heat tracing of the vent stack 340 as described herein reduces a number of components within the electrochemical cell system 300 configured for outdoor use to prevent freezing of the moist gas stream produced by the cell 200.

In an embodiment, a vent temperature sensor 390 is in thermal communication with at least one of the vent stack 340 and the moist gas stream therein. The vent temperature sensor 390 is productive of a signal representative of a temperature of at least one of the vent stack 340 and the moist gas stream therein. The vent temperature sensor 390 is in signal communication with the controller 350. In response to the vent temperature sensor 390 producing a signal that represents a temperature that may lead to freezing of the moist gas stream, the heater 355 and fan 360 are responsive to the controller 350 to maintain an operating vent temperature of at least one of the vent stack 340 and the moist gas stream that will prevent freezing of the moist gas stream.

Air 365 flowing through the heat stack 315 provides a source of dilution of the moist gas stream at an exit point 395 of the vent stack 340. In an embodiment in which the moist gas stream within the vent stack 340 includes hydrogen gas 112, such dilution is desirable to prevent a potential buildup or concentration of hydrogen gas 112 proximate the exit point 395.

As disclosed, some embodiments of the invention may include some of the following advantages: the ability to prevent freezing of a moist gas stream within an electrochemical cell system vent stack; the ability to increase an operating reliability of an electrochemical cell system adapted for outdoor use where temperatures may fall below freezing by reducing a total number of operating parts; the ability to increase a net efficiency of the electrochemical cell system by eliminating energy consumed by heat tapes; the ability to reduce operating costs of an electrochemical cell system adapted for outdoor use where temperatures may fall below freezing by eliminating a requirement for dried carrier gas; and the ability to dilute a moist gas stream without requiring a supply of dried carrier gas.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system to vent a moist gas stream comprising:
    an enclosure;
    an electrochemical cell disposed within the enclosure, the electrochemical cell productive of the moist gas stream;
    a first vent in fluid communication with the electrochemical cell for venting the moist gas stream to an exterior of the enclosure; and
    a second vent in fluid communication with an interior of the enclosure and in thermal communication with the first vent for discharging heated air to the exterior of the enclosure, at least a portion of the discharging heated air for preventing freezing of the moist gas stream within the first vent.

2. The system of claim 1, wherein the second vent is in thermal communication with the first vent via at least one of:
    the second vent disposed surrounding the first vent;
    the first vent disposed surrounding the second vent;
    the second vent disposed adjacent the first vent; and
    the second vent disposed proximate the first vent.

3. The system of claim 1, wherein:
    the electrochemical cell is an electrolysis cell.

4. The system of claim 1, wherein:
    the moist gas stream comprises hydrogen gas.

5. The system of claim 1, further comprising:
    a temperature sensor disposed proximate the enclosure, the temperature sensor productive of a signal representative of a temperature proximate the enclosure.

6. The system of claim 5, wherein:
    the temperature sensor is disposed within the interior of the enclosure and is productive of a signal representative of a temperature of the interior of the enclosure.

7. The system of claim 5, further comprising:
    a controller receptive of the signal; and
    a fan disposed proximate the enclosure, the fan responsive to the controller to circulate air and maintain a defined temperature within the enclosure.

8. The system of claim 7, further comprising:
a heater disposed proximate the enclosure, the heater responsive to the controller to generate heat and maintain the defined temperature within the enclosure.

9. The system of claim 1, further comprising:
a storage container disposed within the enclosure, the storage container in fluid communication with the electrochemical cell.

10. The system of claim 9, wherein:
the storage container contains water.

11. The system of claim 8, further comprising:
a vent temperature sensor in thermal communication with at least one of the first vent and the moist gas stream, the vent temperature sensor productive of a signal representative of a vent temperature of at least one of the first vent and the moist gas stream;
wherein the controller is receptive of the signal representative of the vent temperature; and
wherein at least one of the heater and the fan are responsive to the controller to maintain an operating vent temperature.

12. An electrochemical cell system comprising:
an enclosure;
an electrochemical cell disposed within the enclosure, the electrochemical cell productive of a moist gas stream;
a venting system to vent the moist gas stream, the venting system comprising:
  a first vent in fluid communication with the electrochemical cell for venting the moist gas stream to an exterior of the enclosure; and
  a second vent in fluid communication with an interior of the enclosure and in thermal communication with the first vent for discharging heated air to the exterior of the enclosure, at least a portion of the discharging heated air for preventing freezing of the moist gas stream within the first vent.

13. The system of claim 12, wherein the second vent is in thermal communication with the first vent via at least one of:
the second vent disposed surrounding the first vent;
the first vent disposed surrounding the second vent;
the second vent disposed adjacent the first vent; and
the second ventdisposed proximate the first vent.

14. The system of claim 12, wherein:
the electrochemical cell is an electrolysis cell.

15. The system of claim 12, wherein:
the moist gas stream comprises hydrogen gas.

16. The system of claim 12, further comprising:
a temperature sensor disposed proximate the enclosure, the temperature sensor productive of a signal representative of a temperature proximate the enclosure.

17. The system of claim 16, wherein:
the temperature sensor is disposed within the interior of the enclosure and is productive of a signal representative of a temperature within the enclosure.

18. The system of claim 16, further comprising:
a controller receptive of the signal; and
a fan disposed proximate the enclosure, the fan responsive to the controller to circulate air and maintain a defined temperature within the enclosure.

19. The system of claim 17, further comprising:
a heater disposed proximate the enclosure, the heater responsive to the controller to generate heat and maintain the defined temperature within the enclosure.

20. The system of claim 18, further comprising:
a vent temperature sensor in thermal communication with at least one of the first vent and the moist gas stream, the vent temperature sensor productive of a signal representative of a vent temperature of at least one of the first vent and the moist gas stream;
wherein the controller is receptive of the signal representative of the vent temperature; and
wherein at least one of the heater and the fan are responsive to the controller to maintain an operating vent temperature.

* * * * *